(12) United States Patent
Given et al.

(10) Patent No.: US 11,405,749 B2
(45) Date of Patent: Aug. 2, 2022

(54) RECIPROCAL-BASIS AUTHORIZATION FOR PROXIMATE PRESENCE REVEAL WITH LOCATION PRIVACY MAINTAINED

(71) Applicant: KNOWHERE APP INC., Los Angeles, CA (US)

(72) Inventors: Lachlan Paul Given, Austin, TX (US); Paul Charles Valmorbida, Los Angeles, CA (US); Jonathan Zawada, Tuckombil (AU); James Knight, Los Angeles, CA (US)

(73) Assignee: KNOWHERE APP INC., Los Angeles, CA (US)

( * ) Notice: Subject to any disclaimer, the term of this patent is extended or adjusted under 35 U.S.C. 154(b) by 0 days.

(21) Appl. No.: 16/581,015

(22) Filed: Sep. 24, 2019

(65) Prior Publication Data

US 2020/0100058 A1  Mar. 26, 2020

Related U.S. Application Data

(60) Provisional application No. 62/735,591, filed on Sep. 24, 2018.

(51) Int. Cl.
| | |
|---|---|
| *H04W 4/02* | (2018.01) |
| *H04W 12/02* | (2009.01) |
| *H04W 12/08* | (2021.01) |
| *H04W 12/64* | (2021.01) |

(52) U.S. Cl.
CPC ........... *H04W 4/023* (2013.01); *H04W 12/02* (2013.01); *H04W 12/08* (2013.01); *H04W 12/64* (2021.01)

(58) Field of Classification Search
CPC .................. H04W 4/00–029; H04W 4/21
See application file for complete search history.

(56) References Cited

U.S. PATENT DOCUMENTS

| | | |
|---|---|---|
| 7,317,927 B2 | 1/2008 | Staton |
| 8,385,964 B2 | 2/2013 | Haney |
| 8,396,489 B2 | 3/2013 | Platt |
| 8,536,999 B2 | 9/2013 | Holcman |
| 8,737,607 B2 | 5/2014 | Appleton |
| 8,831,640 B2 | 9/2014 | Trinchero |
| 9,148,754 B2 | 9/2015 | Vanderwater |
| 9,247,386 B2 | 1/2016 | Kau |
| 9,247,408 B2 | 1/2016 | South |
| 9,351,114 B2 | 5/2016 | Chatterjee |
| 9,363,639 B2 | 6/2016 | Eland |

(Continued)

FOREIGN PATENT DOCUMENTS

| | | |
|---|---|---|
| WO | WO2014005190 A2 | 7/2016 |
| WO | WO2017100301 A1 | 6/2017 |

OTHER PUBLICATIONS

Li, et al., "Search me if you can: privacy-preserving location query service", INFOCOM, 2013 Proceedings IEEE, IEEE, 2013, Best Available Date: Apr. 14-19, 2013.

(Continued)

*Primary Examiner* — San Htun
(74) *Attorney, Agent, or Firm* — Haynes and Boone, LLP

(57) ABSTRACT

A networked information system reveals location information only to user contacts within a geographic range of the location-revealing user, and then only on a reciprocal authorization basis. Such a system provides a scalable, privacy-maintaining location-based service framework suitable for social networks and mobile users.

14 Claims, 5 Drawing Sheets

(56) References Cited

U.S. PATENT DOCUMENTS

| | | | |
|---|---|---|---|
| 9,420,420 B2 | 8/2016 | Sabatelli | |
| 9,646,333 B1 | 5/2017 | Kolton | |
| 9,693,536 B1 | 7/2017 | Dana | |
| 9,705,996 B2 | 7/2017 | Oh | |
| 2008/0070593 A1* | 3/2008 | Altman | H04W 4/029 455/457 |
| 2011/0238755 A1 | 9/2011 | Khan et al. | |
| 2012/0042390 A1* | 2/2012 | Iwuchukwu | H04L 63/10 726/27 |
| 2012/0271883 A1* | 10/2012 | Montoya | H04W 4/029 709/204 |
| 2013/0231858 A1* | 9/2013 | Bourne | H04W 4/029 701/439 |
| 2014/0199970 A1* | 7/2014 | Klotz | H04W 12/02 455/411 |
| 2014/0213304 A1* | 7/2014 | Beckett | G01C 21/32 455/456.6 |
| 2014/0310101 A1 | 10/2014 | Roberts | |
| 2015/0186891 A1 | 7/2015 | Wagner et al. | |
| 2015/0289095 A1 | 8/2015 | Sabatelli et al. | |
| 2016/0005003 A1 | 1/2016 | Norris | |
| 2016/0050525 A1 | 2/2016 | Droll | |
| 2016/0057576 A1 | 2/2016 | Kessler | |
| 2016/0171232 A1* | 6/2016 | Shoemaker | G06F 16/27 707/783 |
| 2016/0381501 A1 | 12/2016 | Ballezzi | |
| 2017/0164146 A1 | 6/2017 | Coppert | |
| 2017/0295252 A1 | 10/2017 | Mottur | |

OTHER PUBLICATIONS

Fawaz et al., "Location privacy protection for smartphone users", Proceedings of the 2014 ACM SIGSAC Conference on Computer and Communications Security. ACM, 2014, Nov. 3-7, 2014.

* cited by examiner

RECIPROCAL-BASIS AUTHORIZATION FOR PROXIMATE PRESENCE REVEAL WITH LOCATION PRIVACY MAINTAINED

CROSS REFERENCE TO RELATED APPLICATION

The present application claims priority to and the benefit of U.S. Provisional Patent Application No. 62/735,591 filed Sep. 24, 2018, which is hereby incorporated by reference in its entirety as if fully set forth below and for all applicable purposes.

BACKGROUND

Field of the Invention

The invention relates generally to location services and, in particular, to systems and techniques by which users may selectively authorize, on a reciprocal basis, interchange of coarse-grain location information with precise location privacy maintained.

Description of the Related Art

Modern mobile phones, some wearable or portable devices and even vehicles are often equipped with geopositioning systems, typically including receiver circuits and software to precisely determine location based on global positioning system (GPS) and/or other overhead satellite constellation(s). As a result, precise locations of an individual typically associated (or associable) with such phones, devices and/or vehicles can be determined and, if desirable, communicated to others and/or reported via application service platforms.

The Find My Friends app available on iOS® devices and related services provided using features of the iCloud® service (both available from Apple, Inc.) are widely-deployed examples of location sharing systems. iOS is a trademark of Cisco used by Apple, under license. Likewise, features popularized by the zen.ly app (and now incorporated in the Snapchat® app, available from Snap, Inc.) allow users to optionally share their location with friends. In each case, location service features present the reasonably precise location of one user to another user consistent with express or implied authorizations to do so.

In some location-based services, access to location information may be restricted based on group-based access controls. For example, a user of such location-based services may authorize a specific set of friends, family members or other users to receive location information, while maintaining location privacy relative to unrelated or unauthorized users and the public, at large. Other location-based services may only provide binary (on/off, all or nothing) control of location reporting. Neither group-based access controls nor all-or-nothing, binary controls, are particularly scalable solutions for location privacy within and amongst large and dynamically changing social networks.

Solutions based on detected device proximity, whether based on mobile devices communicating with a same cellular tower transceiver, peer-to-peer communications, e.g., via Bluetooth® short-range personal area network communications, or based on geofencing, have also been proposed. See e.g., U.S. Pat. No. 9,420,420. Bluetooth is a trademark of Bluetooth SIG, Inc. However, while the solutions disclosed may allow a location receiving user to limit information overload from non-proximate user notifications, such solutions do not themselves provide users with privacy control over their own location revealed to others, except (again) on a binary basis.

Improved techniques and functional capabilities are desired, particularly relative to maintaining location privacy of users.

SUMMARY

It has been discovered that a networked information system that reveals location information only to user contacts within a geographic range of the location-revealing user, and then only on a reciprocal authorization basis, can provide a scalable, privacy-maintaining location-based service framework suitable for social networks and mobile users. Typical system implementations include mobile device-resident applications or application programmer interfaces (APIs) communicating over wide-area networks with cloud-based service platforms that mediate the privacy-maintaining location-based services. Geographic region-denominated authorization of a first user is typically controlled by the first user who reveals her presence (or future presence) to one or more second users in the geographic region through a network-coupled location service, but only on a reciprocal basis such that presence is only revealed to the second user(s) if the second user(s) has (have) likewise reciprocally authorized that their presence (or future presence) may be revealed to the first user based on the second users' geographic region-denominated authorization. For each user, precise location privacy is maintained by the reciprocal basis location service.

Current geopositioning information for a given user is typically supplied from one or more of a network coupled phone, wearable electronic device, or vehicle that has been enrolled with the reciprocal basis location service and has (or interfaces with) a receiver for GPS or similar positioning information. Future (projected) geoposition may be derived from location information associated with a user's calendared events or appointments. Interfaces and access to contact, calendar and/or social network information stored or accessible from mobile devices or using cloud based information resources are all contemplated.

User interface features of such devices may be employed to define or update the scope of reciprocal basis authorizations. Reciprocal basis authorizations are parameterized at least based on a user-defined or definable geographic scope, but in some cases or embodiments may have temporal scope and/or may be further parameterized based on social network connections (friend, family, acquaintance, friend-of-friend), common interests, affiliations or relationship status, or ad hoc factors (such as event participation, affinity group membership, message feed follower status, hash tag associations, etc.). In some cases or embodiments, the region that establishes geographic scope of a reciprocal basis authorization may be specified by a user as a radius around a current or future position, e.g., using a user interface slider mechanic with or without corresponding onscreen presentation of a circular region on a map. In some cases or embodiments, a more complex, e.g., polygonal or freeform, region may be circumscribed on a map, e.g., using a finger-trace gesture on a touchscreen.

In some embodiments of the present invention(s), a system includes a service platform and plural portable computing devices. The plural portable computing devices are capable of determining, and communicatively coupled to communicate to the service platform, respective geographic locations of respective users thereof, together with respective user-selected search regions. The user-selected search regions establish, for each respective user, a limited geographic range of locations within which the respective user authorizes, on a reciprocal basis, information exchange with one or more of the other users. Based on the reciprocal basis authorizations, the service platform reveals proximate presence of respective pairs of users to each other without revealing geographic location of either user to the other.

In some cases or embodiments, the respective user-selected search regions delimit generally circular geographic regions and are characterized by respective radii around the geographic location of the respective portable computing device or respective user. In some cases or embodiments, as between respective pairs of first and second users, the established reciprocal basis authorizations require that, at the same time, the unrevealed location of the second user be within the search region of the first user and that the unrevealed location of the first user be within the search region of the second user. In some cases or embodiments, the respective geographic locations include either or both of (i) current geographic location of the respective user-associated portable computing devices and (ii) one or more calendared future geographic locations of the respective users.

In some embodiments of the present invention(s), a method includes specifying, at a user interface of a first portable computing device capable of determining its current geographic location, a user selectable first search region, the first search region establishing a limited geographic range of locations within which a first user of the portable computing device authorizes, on a reciprocal basis, information exchange with a set of users that includes a second user of a remote second device. The method further includes, the first portable computing device communicating, via the network, the first search region to a service platform to selectively, based on the reciprocal basis authorization, reveal proximate presence information between the first and second users without revealing location of either the first user or the second user to the other.

In some cases or embodiments, the first search region delimits a generally circular geographic region and is characterized by a first radius around the current geographic location of the portable computing device. In some cases or embodiments, the reciprocal basis authorization is further based on an additional authorization whereby the second user has specified a second search region that establishes a limited geographic range of locations within which the second user authorizes information exchange with a set of users that includes the first user.

In some cases or embodiments, the first search region delimits a generally circular geographic region and is characterized by a first radius around the current geographic location of the portable computing device, the second search region delimits a generally circular geographic region and is characterized by a second radius around the current geographic location of the remote second device, and the selective authorization requires that, at the same time, the unrevealed location of the second user be within the delimited first search region and that the unrevealed location of the first user be within the delimited second search region.

In some cases or embodiments, the limited geographic range of the first user's authorization is changeable on the portable computing device using a slider- or radius-manipulation on a touchscreen user interface of the portable computing device.

In some cases or embodiments, first and second users have registered a predefined relationship with the service platform. In some cases or embodiments, for the first and second users, the reciprocal basis authorization is negotiated via the service platform, at least in part, based on identity information stored on or accessible from the portable computing device In some cases or embodiments, the identity information includes an eMail address, social media handle or phone number.

In some cases or embodiments, the selective exchange is via the service platform. In some cases or embodiments, the selective exchange includes peer-to-peer exchange between the first portable computing device and the remote second device that is coordinated, at least in part, by the service platform. In some cases or embodiments, the selective exchange is cryptographically secured.

In some embodiments, the method further includes communicating the first user's current geographic location to the service platform as a cryptographically secured information encoding. In some embodiments, the method further includes retrieving calendar information of the first user and, based on the retrieved calendar information, communicating to the service platform as a cryptographically secured information encoding, one or more future geographic locations of the first user. The first radius further characterizes one or more generally circular regions around the one or more future geographic locations and further establishes geographic scope of the first users reciprocal basis authorization relative to the one or more future geographic locations. In some embodiments, the method further includes cryptographically securing at rest at the service platform, the current and future geographic locations of the first user.

In some cases or embodiments, the method further includes presenting at least a portion of the exchanged information via a messaging user interface executing on the portable computing device. In some cases or embodiments, the method further includes presenting at least a portion of the exchanged information via a notification user interface executing on the portable computing device.

In some cases, the method is embodied, at least in part, as a computer program product encoding of instructions executable on the first portable computing device to communicate the first user's reciprocal basis authorization and one or more respective geographic locations, and to visually indicate to the first user proximate presence of the second user without revealing geographic location of either user to the other.

In some embodiments of the present invention(s), a method includes receiving at a service platform, from respective network-coupled portable computing devices, respective encrypted encodings of geographic locations of respective users thereof, together with respective user-selected search regions. The user-selected search regions establish, for each respective user, a limited geographic range of locations within which the respective user authorizes, on a reciprocal basis, information exchange with one or more of the other users. The service platform reveals, based on the reciprocal basis authorizations, proximate presence respective pairs of users to each other without revealing geographic location of either user to the other.

In some cases or embodiments, the respective user-selected search regions delimit generally circular geographic regions and are characterized by respective radii around either or both of current geographic location of the respective portable computing device and one or more calendared future geographic locations of the respective users. In some cases or embodiments, as between respective pairs of first and second users, the established reciprocal basis authorizations require that, at the same time, the unrevealed location of the second user be within the search region of the first user and that the unrevealed location of the first user be within the search region of the second user. In some cases, the method is embodied, at least in part, as a computer program product encoding of instructions executable on the service platform.

These and other embodiments in accordance with the present invention(s) will be understood with reference to the description and appended claims which follow.

BRIEF DESCRIPTION OF THE DRAWINGS

The present invention(s) are illustrated by way of examples and not limitation with reference to the accompanying figures, in which like references generally indicate similar elements or features.

FIG. 2A illustrates reciprocal-basis authorizations resulting in proximity reveals with precise location privacy maintained. FIG. 2B illustrates reciprocal-basis authorizations that do not result in proximity reveals and further maintain precise location privacy.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Figure 1:
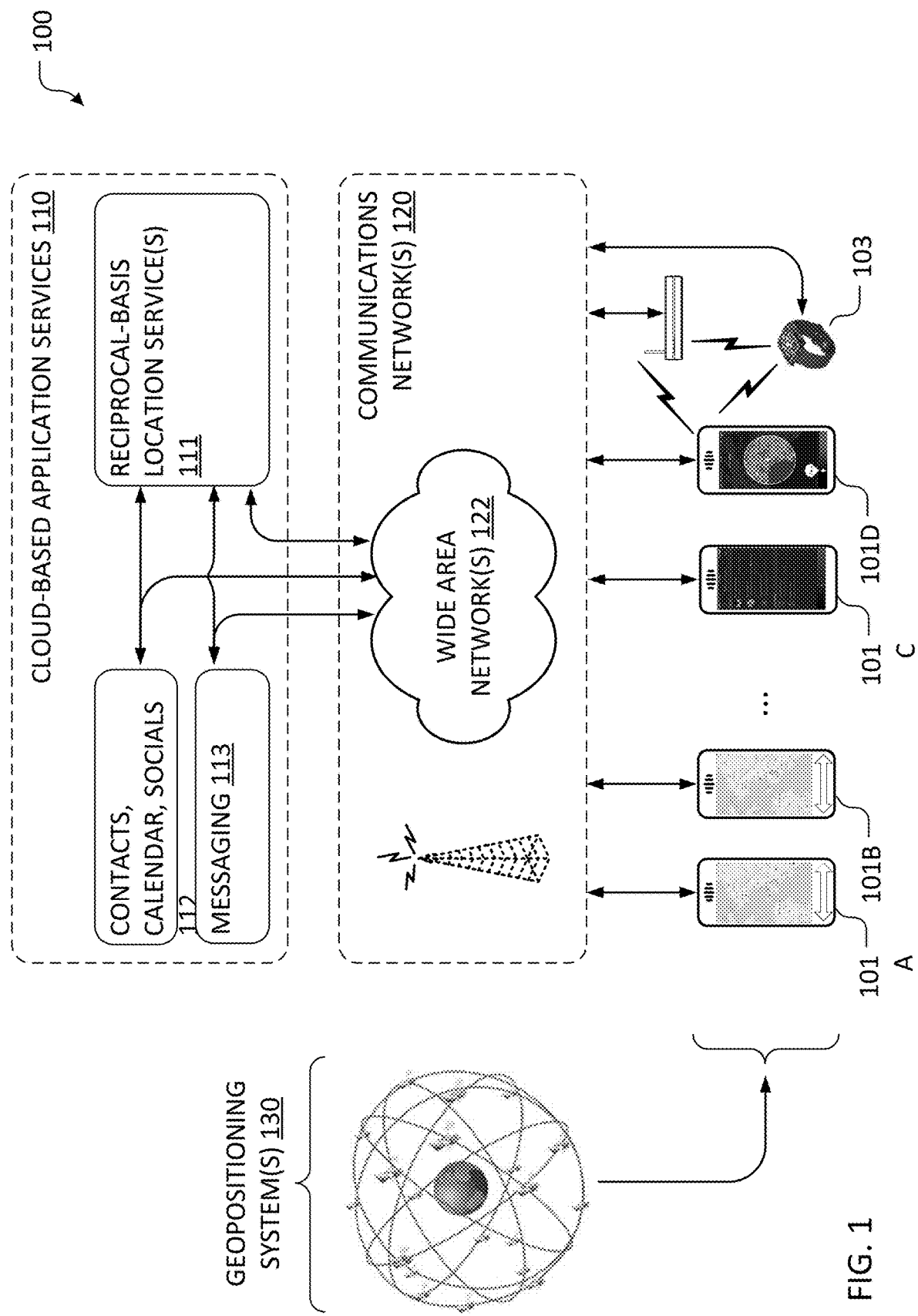
FIG. 1 depicts a network architecture including reciprocal-basis authorization location systems for maintaining location privacy in accordance with some embodiments of the present invention.

FIG. 1 depicts a network service platform architecture including reciprocal-basis authorization location systems 100 for selectively revealing geographic presence while maintaining location privacy in accordance with some embodiments of the present invention. Handheld mobile phone-type devices 101A-101D and smartwatch-type device 101E are exemplary of devices for which reasonably-precise location information (often ten meters or less) may be determined using embedded or associable geopositioning receivers whether based on global navigation satellite system constellations 130, such as the global position system (GPS), GLONASS, Galileo or Beidou constellations, cell-tower triangulation, crowd-sourced Wi-Fi access point data and/or beacons (whether alone or in combination). Such devices will be understood to be directly or indirectly coupled for communication with application services 110, commonly implemented as cloud-based services, and/or with each other via wide-area networks 122 and interconnected local-area, personal-area, wired, wireless, public, private, cellular, mesh and/or other data communications networks or links (collectively communications networks 120).

Cloud based application services 110 includes a reciprocal-basis location service 111 that is configured to receive and collect from connected devices 101A-101E the reasonably-precise geopositioning information ascertainable using the aforementioned GPS receivers and/or other sources. Reciprocal-basis location service 111 is further configured to receive and maintain user authorizations to reveal presence information only to user contacts within a geographic range of the location-revealing user, and then only on a reciprocal authorization basis. While reciprocal-basis location service 111 receives reasonably-precise current geopositioning information for users of connected devices 101A-101E, it reveals only positionally-imprecise presence information in accordance with geographically-parameterized reciprocal-basis authorizations of respective user pairs. Thus, the reciprocal-basis authorization location systems 100, including reciprocal-basis location service 111, allow individual users to selectively reveal presence (and/or future presence, as will be further explained) to users who likewise and reciprocally authorize their presence (and/or future presence) to be reveal, while maintaining the privacy of precise location (or planned future locations) for the respective individual users.

Reciprocal basis authorizations are parameterized at least based on a user-defined or definable geographic scope (as will be explained with further reference to FIGS. 2A and 2B), but in some cases or embodiments may have temporal scope and/or may be further parameterized based on social network connections (friend, family, acquaintance, friend-of-friend), common interests, affiliations or relationship status, or ad hoc factors (such as event participation, affinity group membership, message feed follower status, hash tag associations, etc.). Data interchange with cloud-based social media platforms, calendars, or contact repositories 112 (typically on a pre-authorized and credentialed basis and/or with service- or device client-resident APIs therefor) may be provided to facilitate such further parameterizations of reciprocal-basis authorization as well as to harvest/populate/synchronize contact and event information.

Figure 2A:
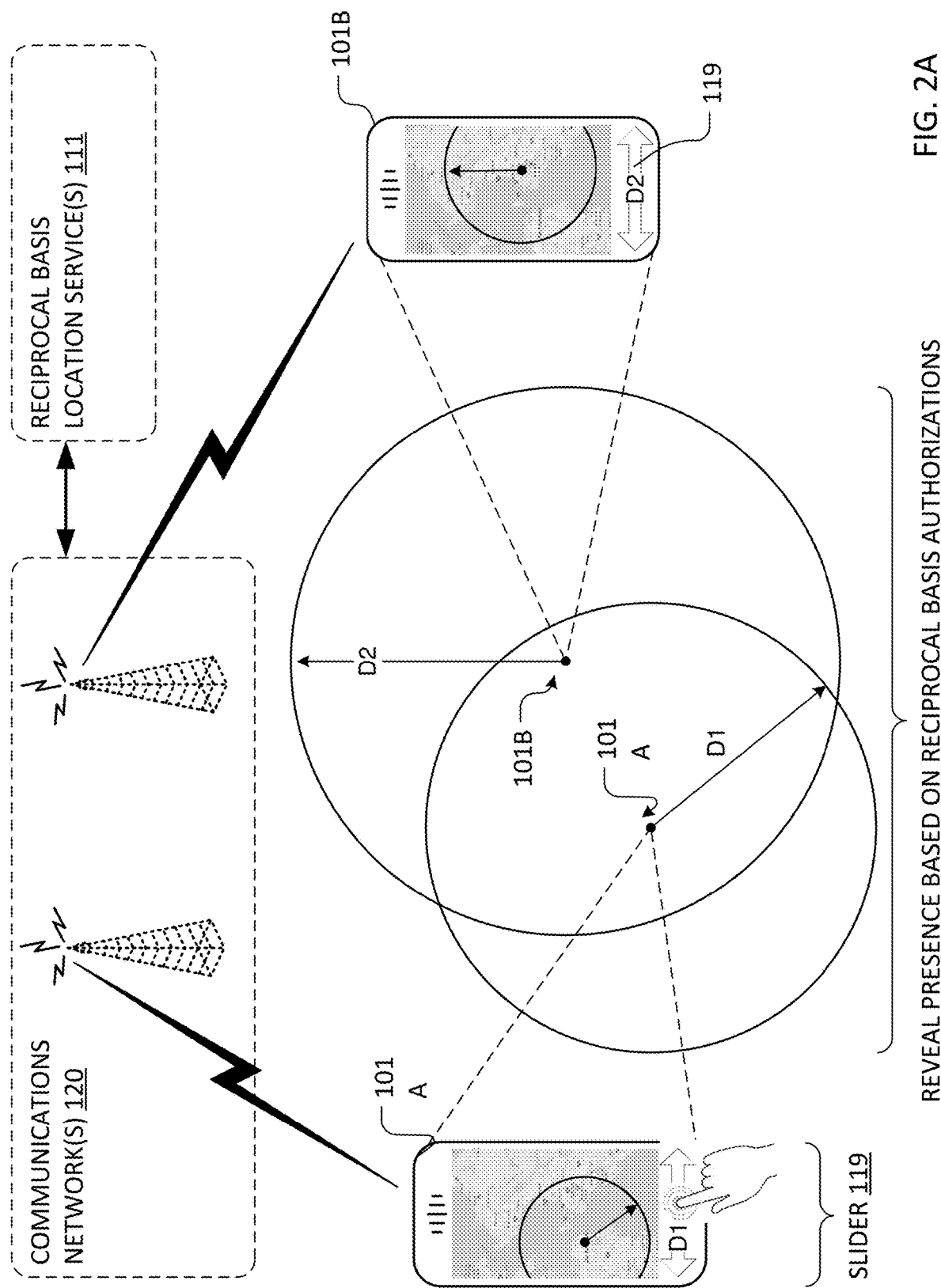
FIGS. 2A and 2B depict operation of a reciprocal-basis authorization location system including a slider mechanism for user control of a radial-distance denominated geographic region in accordance with some embodiments of the present invention.
Figure 2B:
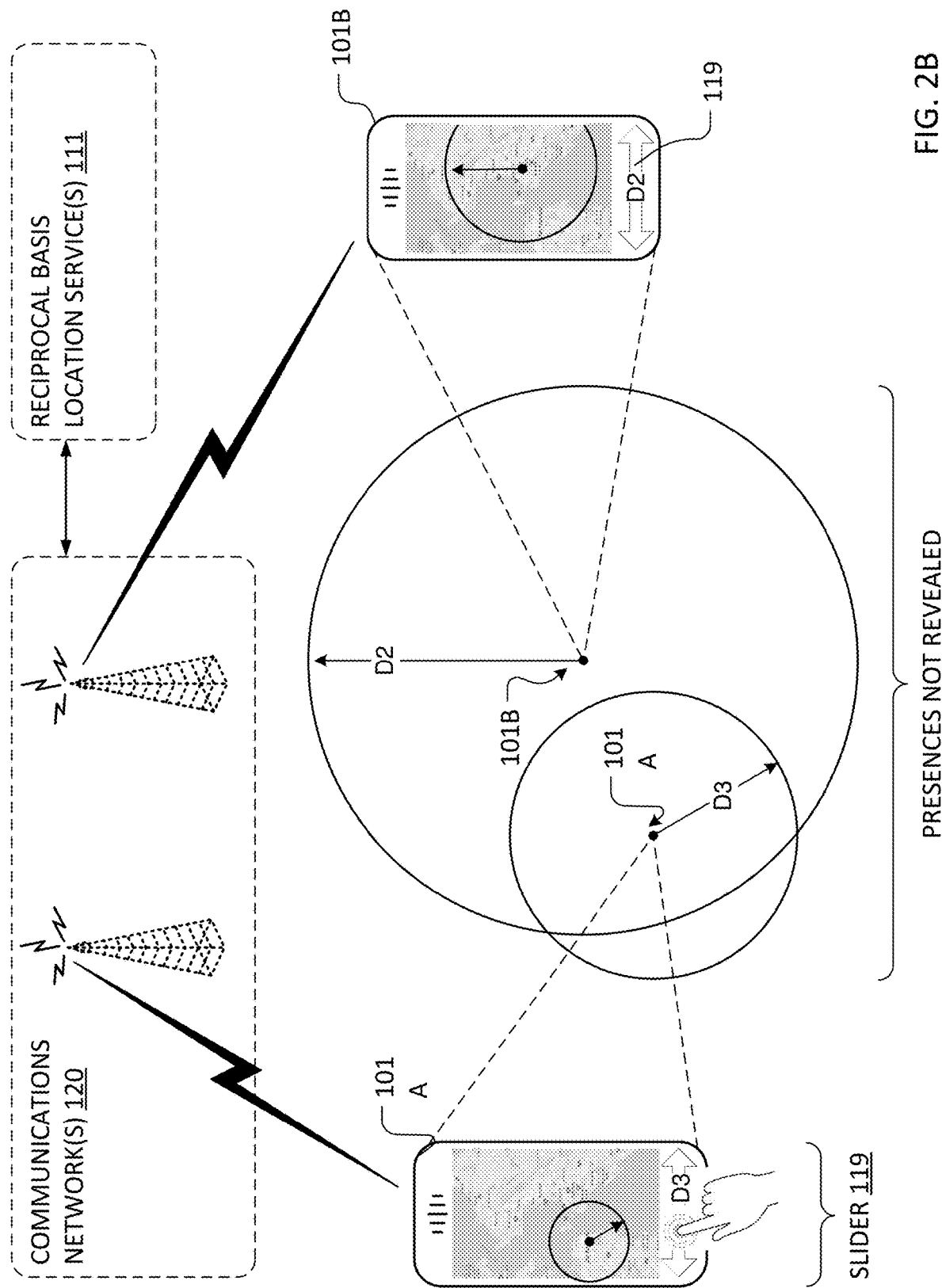

FIGS. 2A and 2B depict operation of a reciprocal-basis authorization location system including a device UI-presented, slider mechanism 119 for user control of a radial-distance denominated geographic region in accordance with some embodiments of the present invention. More specifically, FIG. 2A illustrates reciprocal-basis authorizations based on radial-distance denominated geographic regions D1, D2 for two users and representative devices 101A, 101B, resulting in proximate presence reveals of each to the other with precise location privacy maintained. In contrast, FIG. 2B illustrates reciprocal-basis authorizations based on radial-distance denominated geographic regions D3, D2 that do not support proximate presence reveals of the 101A device user to the user of device 101B or vice versa. In each case, precise location privacy is maintained.

Turning first to FIG. 2A, two users interact with representative devices 101A, 101B to define a geographic scope for their respective reciprocal basis authorizations. In the illustration, the user of device 101A specifies, with a user interface gesture on slider 119, the geographic scope of his reciprocal basis authorization to be a circular area having radius D1 (about 4 miles) centered around his position (currently in the financial district of downtown San Francisco, Calif.). In doing so, the user of device 101A authorizes reciprocal basis authorization services 111 to reveal his presence to contacts within the authorized geographic scope (as defined by D1) within about 4 miles of his present location as reported by device 101A. Because the user of device 101B is within radius D1 and has also specified a geographic scope of her reciprocal basis authorization (a circular area having radius D2, about 5 miles) centered around her position (currently in Oakland, Calif.) that encompasses the location of the device 101A user, reciprocal basis authorization conditions of both users are satisfied and their respective presences, though not precise locations, are revealed to each other.

In contrast, and referring now to FIG. 2B, similar users are similarly positioned, but a reduced geographic scope of the device 101A user's reciprocal basis authorization results in user of device 101B no longer falling within the reduced radius D3 (about 2 miles). Accordingly, the reciprocal basis authorization condition of the device 101 user is not (or is no longer) satisfied, and the respective presence of neither is revealed to the other. Note that even though the location of device 101A (and its user) is within the reciprocal basis authorization (D2, about 5 miles) of user/device 101B, the joint conditions of both users are not satisfied. Accordingly, neither user's presence is revealed to the other.

While geographic scope may be conveniently illustrated using circular regions and slider-varied radii (D1, D2, D3) centered on a current position, persons of skill in the art having benefit of the present disclosure will appreciate other conventions or mechanisms for specifying or parameterizing a geographic scope for a reciprocal basis authorization. For example, the region that establishes geographic scope of a reciprocal basis authorization may be selected from a menu of predetermined radius values around a current or future position, e.g., with or without corresponding onscreen presentation of a slider or circular region on a map. Likewise, in some cases or embodiments, a more complex, e.g., polygonal or freeform, region may be circumscribed on a map, e.g., using a finger-trace gesture on a touchscreen. In each case, and however geographic scope is specified, the joint conditions of both users must be satisfied for the presence of either to be revealed to the other.

Figure 3:
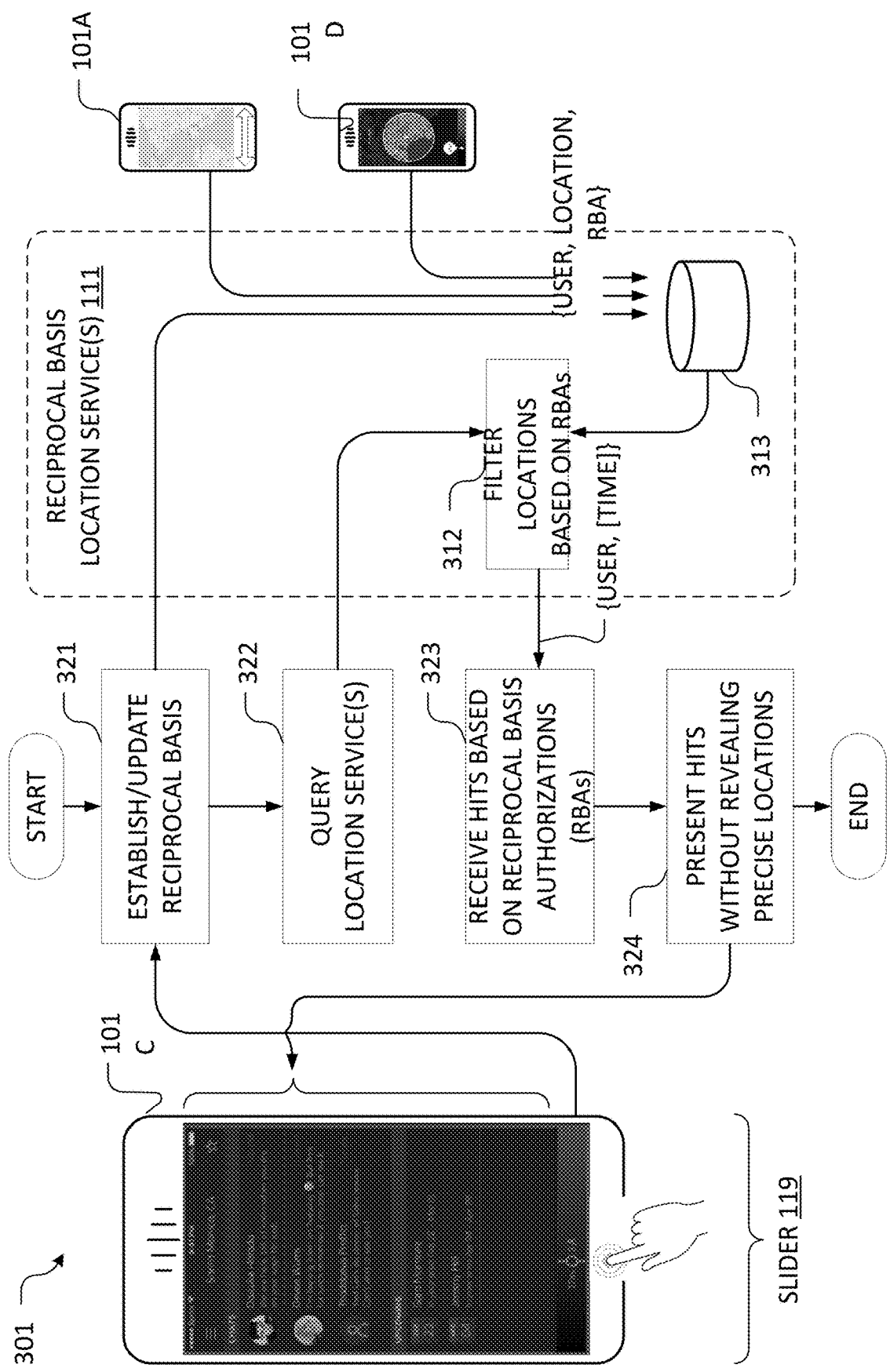
FIG. 3 depicts information and control flows for a process in accordance with some embodiments of the present invention by which a user at a client device specifies a reciprocal basis for authorization of proximity reveals and receives, responsive to a location service query, a responsive set of user-contact hits for whom corresponding reciprocal basis authorizations allow reveal of proximity, but not precise location.

FIG. 3 depicts information and control flows for a process 301 in accordance with some embodiments of the present invention by which a user at a client device 101C specifies (321) a reciprocal basis for authorization of proximity reveals (i.e., reveals of presence within to scope of the reciprocal basis authorizations explained above) and receives, responsive to a location service query (322), a responsive set of user-contact hits for whom corresponding reciprocal basis authorizations allow the reveal of proximity but not precise location. Specifically, a user establishes or updates (321) a reciprocal basis authorization (RBA) communicating same (via communications facilities not specifically shown, but recall FIG. 1), together with a user identifier and a location, to reciprocal basis location service 111. User identifiers, locations and RBA are represented in a database 313 or other storage facility of, or accessible by, reciprocal basis location service 111. Correspondingly, other devices and users, e.g., devices 101A, 101D, also establish or update reciprocal basis authorization (RBAs) that are, in turn, represented in a database 313 or similar storage. Reciprocal basis authorizations may be updated from time-to-time, and positional updates (e.g., based on embedded or associable geopositioning receivers, such as described above) are updated on a recurring basis.

Based on reciprocal basis authorizations so supplied, reciprocal basis location service 111 filters (312) location returns for user pairs, to determine, for any given user, the set of other users (typically other user contacts, social media connections, etc.) for which both user's reciprocal basis authorizations are satisfied. Recall FIG. 2A for an example of geographic scoping of RBAs that support reveal of user presences. Also recall FIG. 2B for an example of geographic scoping of RBAs that do not support reveal of user presences.

In the user interface depiction of FIG. 3, contacts for whom joint RBA conditions are satisfied, and for which filter 312 is selective and user IDs are received (323) as hits, are presented (324) as proximate contact chats or messaging threads without revealing precise location of the corresponding users. Likewise, contacts for whom joint RBA conditions will be satisfied based on locations specified for calendared (e.g., future) events or appointments are presented (324) as contacts who will be proximate based on a correspondence of location(s) for a calendared meeting or event with device 101C user's current, home or future (based on a calendared meeting or event) locations. As before, current or future proximity is revealed, but precise location (or future location) of the corresponding users is not.

Figure 4:
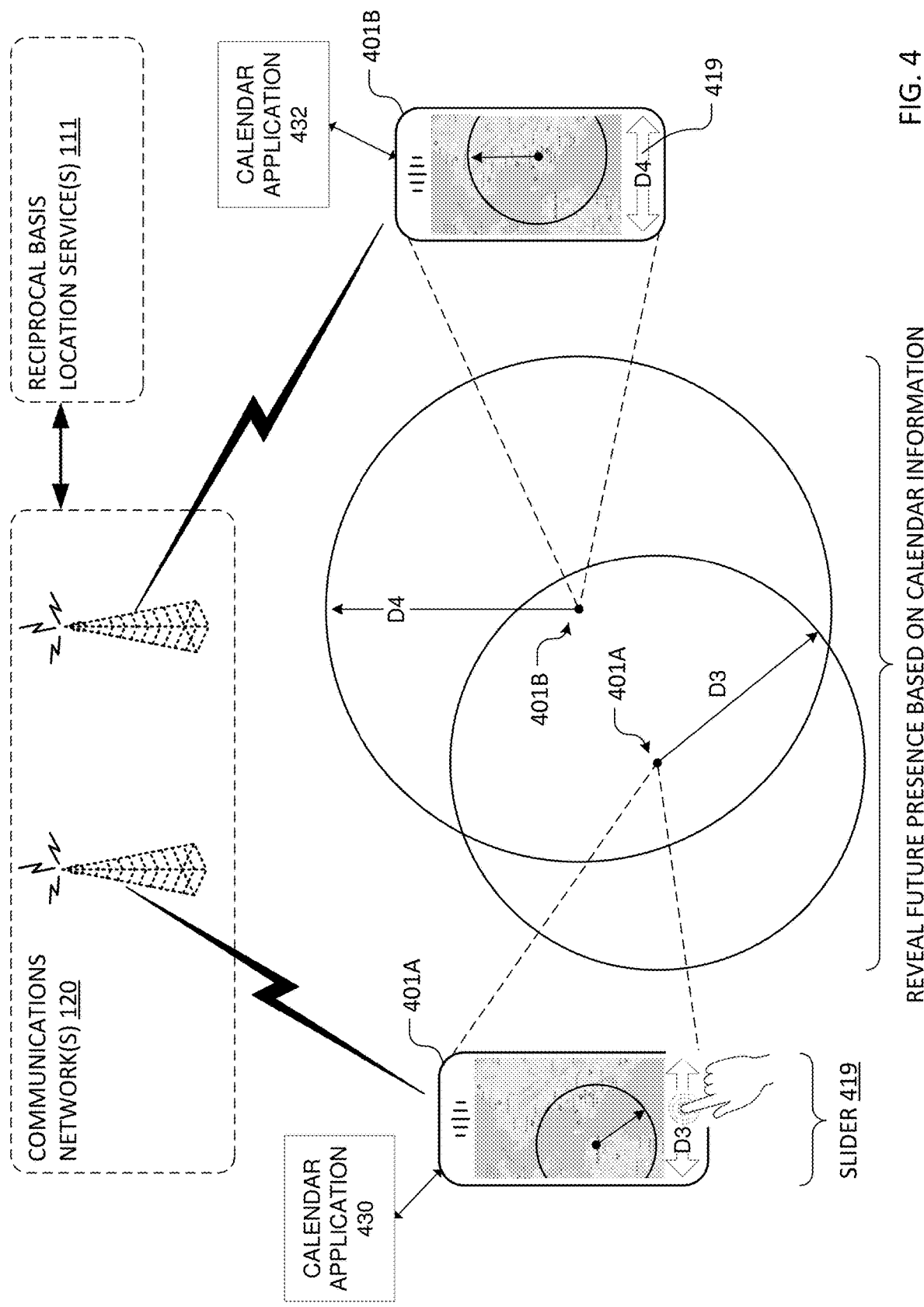
FIG. 4 illustrates reciprocal-basis authorizations resulting in proximity reveals with precise location privacy maintained based on future calendared events.

FIG. 4 depicts the geographic scope of the reciprocal basis authorizations applied to future calendared events. In FIG. 4, two users interact with representative devices 401A, 401B to define a geographic scope for their respective reciprocal basis authorizations. In the illustration, the user of device 401B specifies, with a user interface gesture on slider 419, the geographic scope of his reciprocal basis authorization to be a circular area having radius D3 (about 4 miles) centered around his future calendared position, retrieved from calendar application 430 (for a future calendared event located in the financial district of downtown San Francisco, Calif.). In doing so, the user of device 401A authorizes reciprocal basis authorization services 111 to reveal his future planned presence to contacts within the authorized geographic scope (as defined by D3) within about 4 miles of his future location as reported by device 401A. The user of device 401B retrieves calendar information from calendar application 432, indicating his position will be within radius D3 and has also specified a geographic scope of her reciprocal basis authorization (a circular area having radius D4, about 5 miles) centered around her future calendared position (for a future calendared event in Oakland, Calif.) that encompasses the location of the device 401A user, reciprocal basis authorization conditions of both users are satisfied and their future respective presences, though not precise locations, are revealed to each other.

OTHER EMBODIMENTS

While the invention(s) is (are) described with reference to various embodiments, it will be understood that these embodiments are illustrative and that the scope of the invention(s) is not limited to them. Many variations, modifications, additions, and improvements are possible. For example, while device types, geopositioning techniques, communication facilities and cloud-centric application services have been described, other variations will be appreciated. Furthermore, while illustrative use cases have been described in the context of particular illustrative location-based service applications, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone or Android handheld, a mobile or portable computing device, wearable electronics such as smart watches, and/or network-connected application service platforms) to perform methods described herein. In general, a machine readable medium can include tangible articles that encode information in a form (e.g., as applications, source or object code, functionally descriptive information, etc.) readable by a machine (e.g., a computer, computational facilities of a mobile or portable computing device, media device or streamer, etc.) as well as non-transitory storage incident to transmission of the information. A machine-readable medium may include, but need not be limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
specifying, at a user interface of a first portable computing device capable of determining its current geographic location, a user selectable first search region, the first search region establishing a limited geographic range of locations within which a first user of the portable computing device authorizes, on a reciprocal basis, information exchange with a set of users that includes a second user of a remote second device, wherein the reciprocal basis requires that, for respective pairs of users, one user's presence is revealed to the other only if location of each user of the pair is within the limited geographic range of locations established by the other, wherein the first search region delimits one or more generally circular regions and is characterized, at least in part, by a first radius around the current geographic location of the portable computing device;
via a network, the first portable computing device communicating the first search region to a service platform to selectively, based on the reciprocal basis authorization, reveal proximate presence information between the first and second users without revealing the location of either the first user or the second user to the other, wherein the reciprocal basis authorization is further based on an additional authorization whereby the second user has specified a second search region that establishes a limited geographic range of locations within which the second user authorizes information exchange with a set of users that includes the first user, and wherein the selective authorization requires that, at the same time, the unrevealed location of the second user be within the first search region and that the unrevealed location of the first user be within the second search region;
retrieving calendar information of the first user; and
based on the retrieved calendar information, communicating to the service platform as a cryptographically secured information encoding, one or more future geographic locations of the first user,
wherein the first search region is further characterized by one or more generally circular regions around the one or more future geographic locations and further establishes geographic scope of the first user's reciprocal basis authorization relative to the one or more future geographic locations.

2. The method of claim 1,
wherein the second search region delimits a generally circular geographic region and is characterized, at least in part, by a second radius around the current geographic location of the remote second device.

3. The method of claim 1,
wherein the limited geographic range of the first user's reciprocal basis authorization is changeable on the portable computing device using a slider- or radius-manipulation on a touchscreen user interface of the portable computing device.

4. The method of claim 1,
wherein first and second users have registered a predefined relationship with the service platform.

5. The method of claim 1,
wherein for the first and second users, the reciprocal basis authorization is negotiated via the service platform, at least in part, based on identity information stored on or accessible from the portable computing device.

6. The method of claim 5,
wherein the identity information includes an eMail address, social media handle or phone number.

7. The method of claim 1,
wherein the selective exchange is via the service platform.

8. The method of claim 1,
wherein the selective exchange includes peer-to-peer exchange between the first portable computing device and the remote second device that is coordinated, at least in part, by the service platform.

9. The method of claim 1,
wherein the selective exchange is cryptographically secured.

10. The method of claim 1, further comprising:
communicating the first user's current geographic location to the service platform as a cryptographically secured information encoding.

11. The method of claim 1, further comprising:
at the service platform, cryptographically securing at rest, the current and future geographic locations of the first user.

12. The method of claim 1, further comprising:
presenting at least a portion of the exchanged information via a messaging user interface executing on the portable computing device.

13. The method of claim 1, further comprising:
presenting at least a portion of the exchanged information via a notification user interface executing on the portable computing device.

14. The method of claim 1, embodied, at least in part, as a computer program product encoding of instructions executable on the first portable computing device to communicate the first user's reciprocal basis authorization and one or more respective geographic locations, and to visually indicate to the first user proximate presence of the second user without revealing geographic location of either user to the other.

\* \* \* \* \*